United States Patent
Orr

(10) Patent No.: US 7,639,130 B2
(45) Date of Patent: Dec. 29, 2009

(54) SYSTEM AND METHOD FOR CONTROLLING AN ENUNCIATOR ON AN ELECTRONIC DEVICE

(75) Inventor: Kevin Orr, Elmira (CA)

(73) Assignee: Research In Motion Limited, Waterloo, Ontario (CA)

( * ) Notice: Subject to any disclaimer, the term of this patent is extended or adjusted under 35 U.S.C. 154(b) by 479 days.

(21) Appl. No.: 11/536,189

(22) Filed: Sep. 28, 2006

(65) Prior Publication Data

US 2008/0081674 A1    Apr. 3, 2008

(51) Int. Cl.
*G08B 19/00*    (2006.01)
*H04M 1/725*    (2006.01)
*H04L 12/58*    (2006.01)

(52) U.S. Cl. .................. 340/521; 340/692; 340/7.57; 340/7.2; 455/412.1; 455/412.2; 455/425; 455/567

(58) Field of Classification Search .................. 340/521, 340/692, 7.57
See application file for complete search history.

(56) References Cited

U.S. PATENT DOCUMENTS 6,424,251 B1 *   7/2002   Byrne ........................ 340/7.58
7,027,840 B2 *   4/2006   McKee et al. ................ 455/567
2003/0197597 A1* 10/2003  Bahl et al. .................. 340/7.58
2005/0018834 A1  1/2005   Furnas
2005/0059435 A1  3/2005   McKee et al.

FOREIGN PATENT DOCUMENTS

EP           1699216         6/2006
WO   PCT/EP2004/052395      8/2005

* cited by examiner

*Primary Examiner*—Donnie L Crosland
(74) *Attorney, Agent, or Firm*—Ridout & Maybee LLP

(57) ABSTRACT

An apparatus includes a system and method for controlling the output level of an enunciator on a portable electronic device. In the system, an enunciator management system for an electronic device is provided. The system comprises: an enunciator having a first enunciation level and a lower, second enunciation level; a sensor; a monitoring circuit connected to the sensor providing a trigger signal that registers a notable activation of the sensor; memory to store data relating to the first and the second enunciation levels for the enunciator and adjustment information for the enunciator for an application operating on the device; and an enunciator management module to initiate the enunciator at the first enunciation level and selectively activate the enunciator at the lower, second enunciation level depending on the adjustment information and the trigger signal from the monitoring circuit.

25 Claims, 8 Drawing Sheets

Fig. 2

SYSTEM AND METHOD FOR CONTROLLING AN ENUNCIATOR ON AN ELECTRONIC DEVICE

FIELD OF TECHNOLOGY

The invention described herein relates to a system and method for selectively moderating an output of an enunciator in an electronic device. In particular, the invention described herein relates to controlling the output level of an enunciator, such as a vibrator, by detecting a specific event on the device, such as a nudging of the device.

BACKGROUND

Current wireless handheld mobile communication devices perform a variety of functions to enable mobile users to stay current with information and communications, such as e-mail, corporate data and organizer information while they are away from their desks. A wireless connection to a server allows a mobile communication device to receive information and communications. Such devices invariably have enunciators therein which provide some sort of visual, audible or physical output (e.g. a light, a speaker, a vibrator or a buzzer) to enunciate (i.e. announce) a certain event. Typically, the enunciator is connected to a circuit, which is activated upon the occurrence of a specified event (e.g. receipt of an incoming telephone call, notification of a scheduled meeting, etc.). For example, a buzzer or speaker may be programmed to emit a sound when a call is received at the device.

It will be appreciated that in certain business or social situations, having the enunciators being activated is disruptive (e.g. if a ringer is activated for a call during a meeting or in a movie theatre).

Electronic devices have pre-programmed modes that allow different enunciation levels for such enunciators (e.g. quiet mode). However, use of such modes requires the user to manually enter such mode(s). This can be cumbersome.

There is a need for a system and method which addresses deficiencies in the prior art.

BRIEF DESCRIPTION OF THE DRAWINGS

Embodiments of the invention will now be described, by way of example only, with reference to the accompanying drawings, in which.

DETAILED DESCRIPTION OF AN EMBODIMENT

Figure 1:
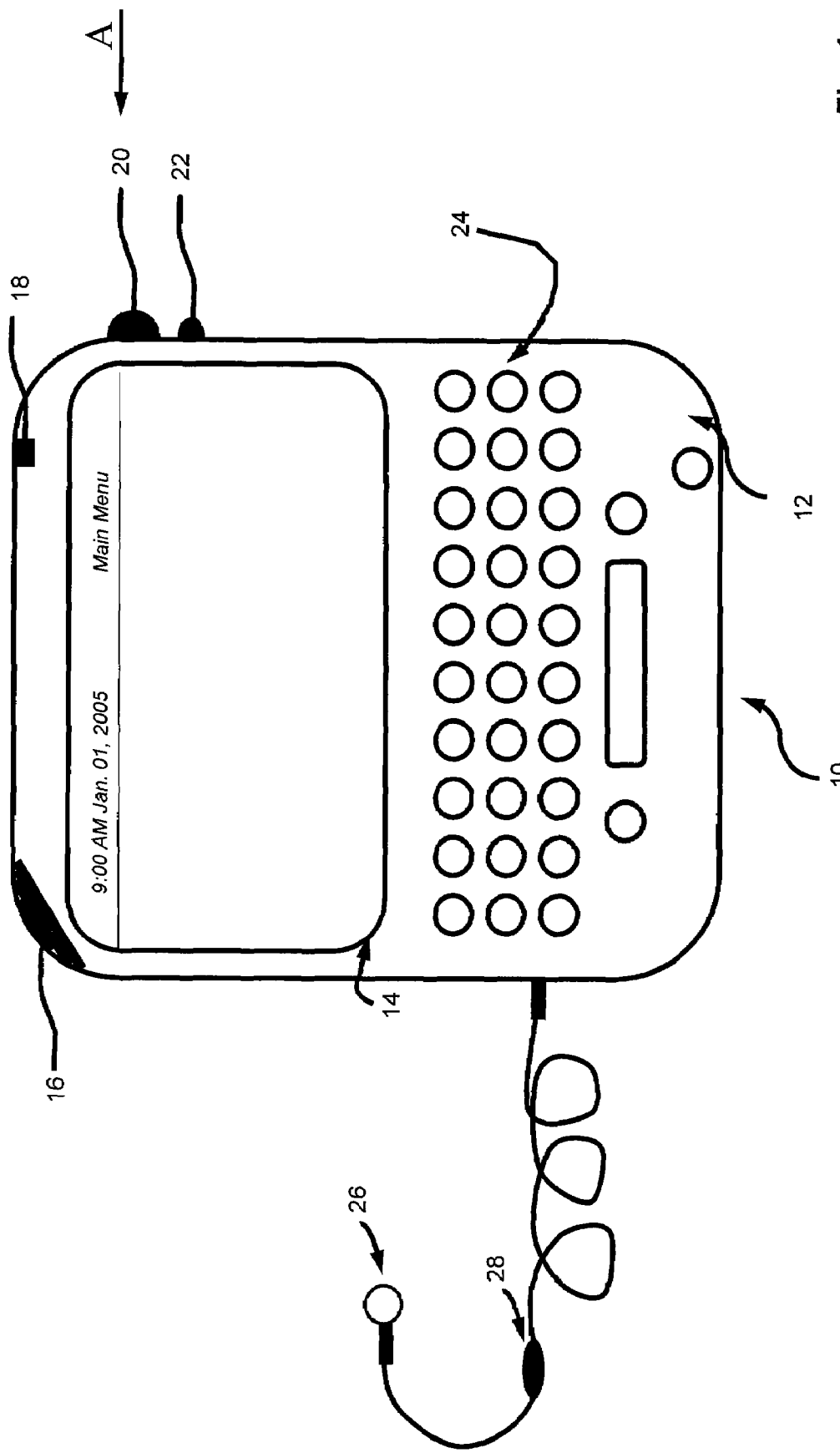
FIG. 1 is a schematic representation of an electronic device having an enunciator, an enunciator control system and a motion sensor with a motion detection system in accordance with an embodiment.

The description which follows and the embodiments described therein are provided by way of illustration of an example or examples of particular embodiments of the principles of the present disclosure. These examples are provided for the purposes of explanation and not limitation of those principles and of the invention. In the description which follows, like parts are marked throughout the specification and the drawings with the same respective reference numerals.

In a first aspect of an embodiment, an enunciator control system for an electronic device is provided. The system comprises: an enunciator having a first enunciation level and a lower, second enunciation level; a sensor; a monitoring circuit connected to the sensor providing a trigger signal to the monitoring circuit that registers a notable activation of the sensor; memory to store data relating to the first and the second enunciation levels for the enunciator and adjustment information for the enunciator for an application operating on the device; and an enunciator management module to initiate the enunciator at the first enunciation level and activate the enunciator at the lower, second level depending on an enunciation event, adjustment information relating to the enunciator and the trigger signal from the monitoring circuit.

The system may further comprise an application providing a graphical user interface (GUI) operating on the device to allow a user of the device to set adjustment information and the first and second enunciation levels.

In the system, the enunciator management module may selectively compare the control signal against a baseline movement level and may activate the enunciator for an enunciation event at the second level when the trigger signal exceeds the baseline movement level.

After setting the enunciation level to the second level, the enunciator management module may subsequently activate the enunciator at the second level.

The enunciator may be selected from a buzzer, a vibrator, a light and a speaker.

The sensor may be an accelerometer or a capacitive sensor. Alternatively or additionally, the sensor may be an input key on the device.

The system may further comprise: memory to store data relating to the first and said second enunciation levels and the adjustment information; and a second application operating on said device utilizing the enunciator and operating with the enunciator management module to control the output of the enunciator.

In a second aspect, a portable electronic communication device is provided. The device comprises: an enunciator having a first enunciation level and a lower, second enunciation level; a sensor; a monitoring circuit connected to the sensor for providing a trigger signal that registers a notable activation of the sensor; memory to store data relating to the first and the second enunciation levels and control information for the enunciator for an application operating on the communication device; an enunciator management module to initiate the enunciator at the first enunciation level and selectively activate the enunciator at the second enunciation level depending on adjustment information associated with the application and the trigger signal from the monitoring circuit; and a microprocessor to control operation of the device.

The device may further comprise an application providing a graphical user interface (GUI) operating on the device to allow a user of the device to set the adjustment information and the first and second enunciation levels for storage in the memory.

In the device, the enunciator management module may selectively compare the trigger signal against a baseline movement level and may activate the second level enunciator at the second level when the trigger signal exceeds the baseline movement level.

In the device, the enunciator management module may initially activate the enunciator at the second level upon a subsequent trigger signal generated by the monitoring circuit upon a subsequent enunciation event.

In the device the first and lower, second enunciation levels for the enunciator may be used by two or more applications operating on said device.

In another aspect, a method for controlling an enunciator for an electronic device is provided. The method comprises: setting an output level of the enunciator to a first enunciation level; monitoring for an enunciation event relating to the enunciator for an application operating on the device, then activating the enunciator at the first enunciation level; monitoring for a notable movement of the electronic device; and if the movement is detected, changing the output level of enunciator to a lower, second enunciation level.

In the method, the first and lower, second enunciation levels may be used for a second application utilizing the enunciator operating on the device.

The method may further comprise, after a preset time, changing the output level back from the lower, second enunciation level back to the first enunciation level for the enunciator.

In other aspects, various combinations of sets and subsets of the above aspects are provided.

Generally, an embodiment provides a system and method of moderating the output of an enunciating device, when a separate control signal is provided from an enunciator management module. A monitoring circuit monitors for a specific activation of a sensor or input device, and when such activation occurs, it generates a trigger signal that is provided to the management module, which then uses adjustment information to moderate the output produced by the enunciating device.

As a particular example an enunciating device may be a vibrator and the sensor is a motion sensor/detector. The communication device is programmed to activate the vibrator upon an event, such as the receipt of an email. When an email is received, the vibrator is activated. If the user of the device then distinctly or otherwise sharply moves or shakes the communication device as the vibrator is operating, the motion detector senses the movement and generates a signal to a motion detector module for evaluation. The module analyses the signal, and if the signal is sufficiently large, then the module provides a trigger signal to a vibrator control circuit. The vibrator control circuit receives the trigger signal and then sends a signal to the vibrator to either deactivate the vibrator or reduce the intensity of the buzzing. If a subsequent email is received, the vibrator may be then activated at the reduced level. A subsequent distinct or abrupt movement of the device may further reduce the intensity of the vibrator. The sensor/input device can be any suitable input device, including any motion sensor, proximity sensor, capacitive sensor, heat sensor, light sensor, keypad, etc.

Exemplary details of embodiments are provided herein. First, a description is provided on general concepts and features of an embodiment. Then, further detail is provided on control features relating to enunciators.

FIG. 1 provides general features of an electronic device for receiving electronic communications in accordance with an embodiment of the invention, which is indicated generally at 10. In the present embodiment, electronic device 10 is based on a computing platform having functionality of an enhanced personal digital assistant with cellphone and e-mail features. It is, however, to be understood that electronic device 10 can be based on construction design and functionality of other electronic devices, such as smart telephones, desktop computers, pagers or laptops having telephony equipment. In a present embodiment, electronic device 10 includes a housing 12, an LCD 14, speaker 16, an LED indicator 18, a trackwheel 20, an ESC ("escape") key 22, keypad 24, a telephone headset comprised of an ear bud 26 and a microphone 28. Trackwheel 20 and ESC key 22 can be inwardly depressed along the path of arrow "A" as a means to provide additional input to device 10.

It will be understood that housing 12 can be made from any suitable material as will occur to those of skill in the art and may be suitably formed to house and hold all components of device 10.

Device 10 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit-switched phone calls. Ear bud 26 can be used to listen to phone calls and other sound messages and microphone 28 can be used to speak into and input sound messages to device 10.

Figure 2:
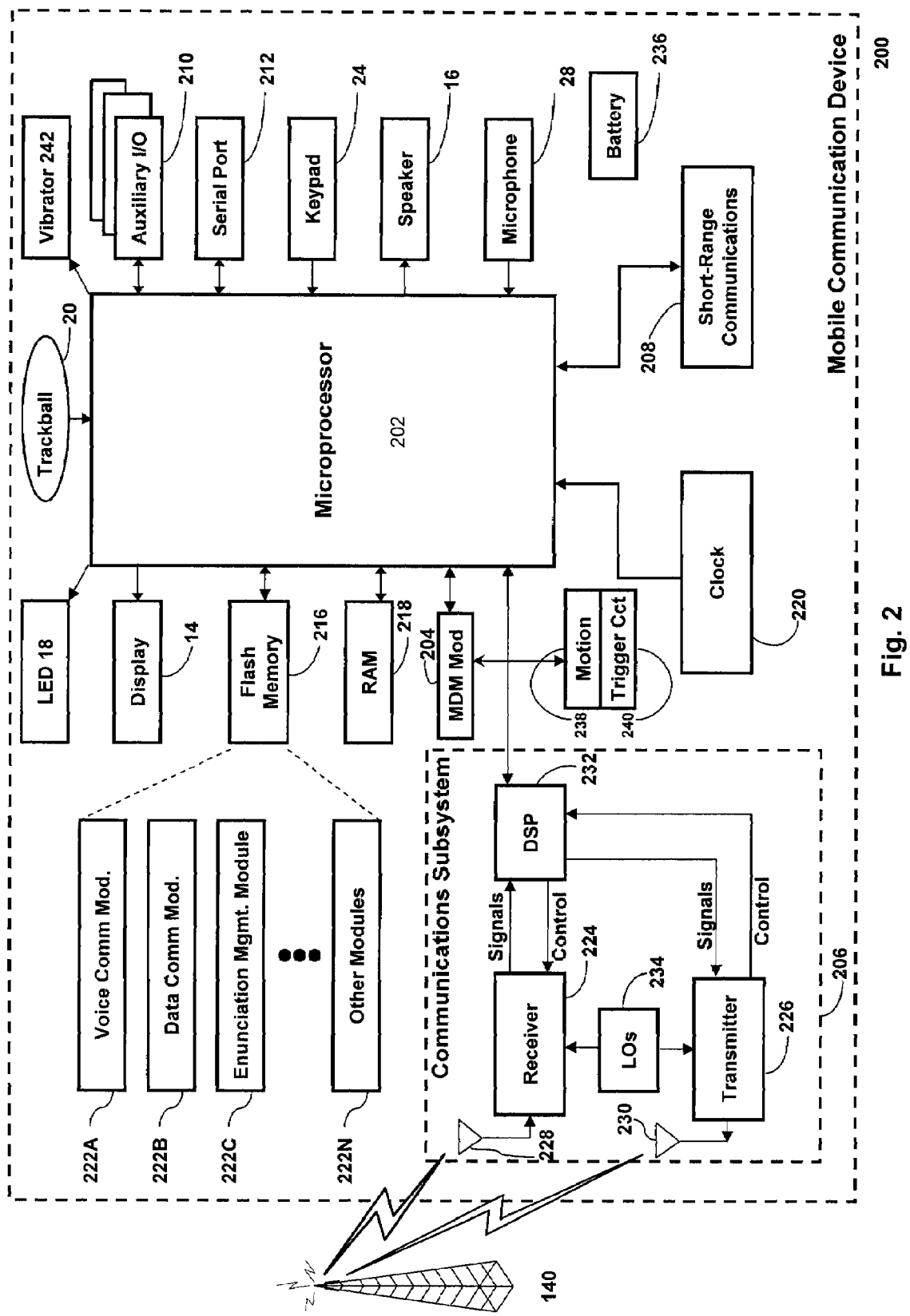
FIG. 2 is a block diagram of certain internal components and the enunciation control system in the device in FIG. 1.

Referring to FIG. 2, functional components of device 10 are provided in schematic 200. The functional components are generally electronic, structural or electro-mechanical devices. In particular, microprocessor 202 is provided to control and receive almost all data, transmissions, inputs and outputs related to device 10. Microprocessor 202 is shown schematically as coupled to keypad 24, motion detection module (MDM) 204 and other internal devices. Microprocessor 202 preferably controls the overall operation of the device 10 and its components. Exemplary microprocessors for microprocessor 202 include Data 950 (trade-mark) series microprocessors and the 6200 series microprocessors, all available from Intel Corporation. Microprocessor 202 is connected to other elements in device 10 through a series of electrical connections to its various input and output pins. Microprocessor 202 has an IRQ input line which allows it to receive signals from various devices. Appropriate interrupt firmware is provided which receives and reacts to the signals detected on the IRQ line.

In addition to the microprocessor 202, other internal devices of the device 10 are shown schematically in FIG. 2. These include: display 14; speaker 16; keypad 24; communication sub-system 206; short-range communication sub-system 208; auxiliary I/O devices 210; serial port 212; microphone port 214 for microphone 28; flash memory 216 (which provides persistent storage of data); random access memory (RAM) 218; clock 220 and other device sub-systems (not shown). Device 10 is preferably a two-way radio frequency (RF) communication device having voice and data communication capabilities. In addition, device 10 preferably has the capability to communicate with other computer systems via the Internet.

Operating system software executed by the microprocessor 202 is preferably stored in a computer-readable medium, such as flash memory 216, but may be stored in other types of memory devices, such as read-only memory (ROM) or similar storage element. In addition, system software, specific device applications, or parts thereof, may be temporarily loaded into a volatile store, such as RAM 218. Communication signals received by the mobile device may also be stored to RAM 218.

Microprocessor 202, in addition to its operating system functions, enables execution of software applications on device 10. A set of software (or firmware) applications, generally identified as applications 222, that control basic device operations, such as voice communication module 222A and data communication module 222B, may be installed on the device 10 during manufacture or downloaded thereafter. Enunciator management module (EMM) 222 C is software that controls enunciation modes for enunciator(s) when they are activated by respective applications 222 (e.g. email, telephone etc.). The output levels of the enunciator(s) are determined, in part, on output(s) provided by MDM 204 and the current output signals provided to one or more enunciators to activate them. As well, additional software modules, such as software module 222N, which may be for instance a personal information manager (PIM) application, may be installed during manufacture or downloaded thereafter into device 10. Data associated with each application can be stored in flash memory 216.

Communication functions, including data and voice communications, are performed through the communication sub-system 206 and the short-range communication sub-system 208. Collectively, sub-systems 206 and 208 provide the signal-level interface for all communication technologies processed by device 10. Various applications 222 provide the operational controls to further process and log the communications. Communication sub-system 206 includes receiver 224, transmitter 226 and one or more antennas, illustrated as receive antenna 228 and transmit antenna 230. In addition, communication sub-system 206 also includes processing modules, such as digital signal processor (DSP) 232 and local oscillators (LOs) 234. The specific design and implementation of communication sub-system 206 is dependent upon the communication network in which device 10 is intended to operate. For example, communication sub-system 206 of device 10 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 10. In any event, communication sub-system 206 provides device 10 with the capability of communicating with other devices using various communication technologies, including instant messaging (IM) systems, text messaging (TM) systems and short message service (SMS) systems.

In addition to processing communication signals, DSP 232 provides control of receiver 224 and transmitter 226. For example, gains applied to communication signals in receiver 224 and transmitter 226 may be adaptively controlled through automatic gain-control algorithms implemented in DSP 232.

In a data communication mode, a received signal, such as a text message or Web page download, is processed by the communication sub-system 206 and is provided as an input to microprocessor 202. The received signal is then further processed by microprocessor 202 which can then generate an output to display 14 or to an auxiliary J/O device 210. A device user may also compose data items, such as e-mail messages, using keypad 24, trackwheel 20 and/or some other auxiliary I/O device 210, such as a touchpad, a rocker switch, a trackball or some other input device. The composed data items may then be transmitted over communication network 140 via communication sub-system 206. Sub-system 206 may also detect when it is out of communication range for its remote systems.

In a voice communication mode, overall operation of device 10 is substantially similar to the data communication mode, except that received signals are output to speaker 16, and signals for transmission are generated by microphone 28. Alternative voice or audio I/O sub-systems, such as a voice message recording sub-system, may also be implemented on device 10. In addition, display 14 may also be utilized in voice communication mode, for example, to display the identity of a calling party, the duration of a voice call, or other voice call-related information.

Short-range communication sub-system 208 enables communication between device 10 and other proximate systems or devices, which need not necessarily be similar devices. For example, the short-range communication sub-system may include an infrared device and associated circuits and components, or a Bluetooth (trade-mark) communication module to provide for communication with similarly enabled systems and devices.

Powering the entire electronics of the mobile handheld communication device is power source 236. In one embodiment, the power source 236 includes one or more batteries. In another embodiment, the power source 236 is a single battery pack, especially a rechargeable battery pack. A power switch (not shown) provides an "on/off" switch for device 10. A power source interface (not shown) may be provided in hardware, firmware, software or a combination of such elements to selectively control access of components in device 10 to power source 236. Upon activation of the power switch an application 222 is initiated to turn on device 10. Upon deactivation of the power switch, an application 222 is initiated to turn off device 10. Power to device 10 may also be controlled by other devices and by software applications 222.

Further detail is now provided on aspects of an embodiment relating to control of an enunciator. It will be appreciated that an application operating on device 10 may need to alert or notify the user of an event detected by or produced by the application. For example, for voice communicator module 222A, when a telephone call is received, device 10 may notify the user that the event has occurred by activating one or more of: an output on speaker 16; vibrator 242; or an LED 18. Also, an enunciation may be generated when an email message is received or a scheduled meeting appointment or wake up time has arrived. Each of these notifications, for the sake of convenience, are referred to as an "enunciation" and each device is generally referred to as an enunciation device. The terms "enunciator" and "enunciation device" are not limiting; they generally refer to any output device in device 10 that can be selectively activated and de-activated to enunciate (i.e. signal, announce, indicate, notify etc.) a particular event. The enunciation may be through any visual, audible or physical indication. As such, an enunciator can be a buzzer, vibrator, speaker, tone generator, light or any other suitable device or mechanism.

An enunciator may be connected to a controlling circuit that selectively activates and de-activates the enunciator. For example, the circuit may also increase or decrease the enunciation level of the enunciator (e.g. change the output level of the enunciator, change the intensity of the display, volume or buzzing). The controlling circuit may simply be a connection to an output line on microprocessor 202 which has software/firmware operating thereon to generate a compatible output signal for the enunciator.

For the embodiment, the controlling circuit is provided by MDM 204, comprising trigger circuit 240, motion sensor 238 and EMM 222C. Briefly, trigger circuit 240 is used with motion sensor 238 to detect a sufficient movement or activation of device 10 to provide a triggering signal to EMM 222C. Once the signal is activated, the circuit can be used to selectively change the output level of an enunciator by EMM 222C. In other embodiments, trigger circuit 240 and sensor 238 may be provided in separate modules instead of through MDM 204.

Figure 3A:
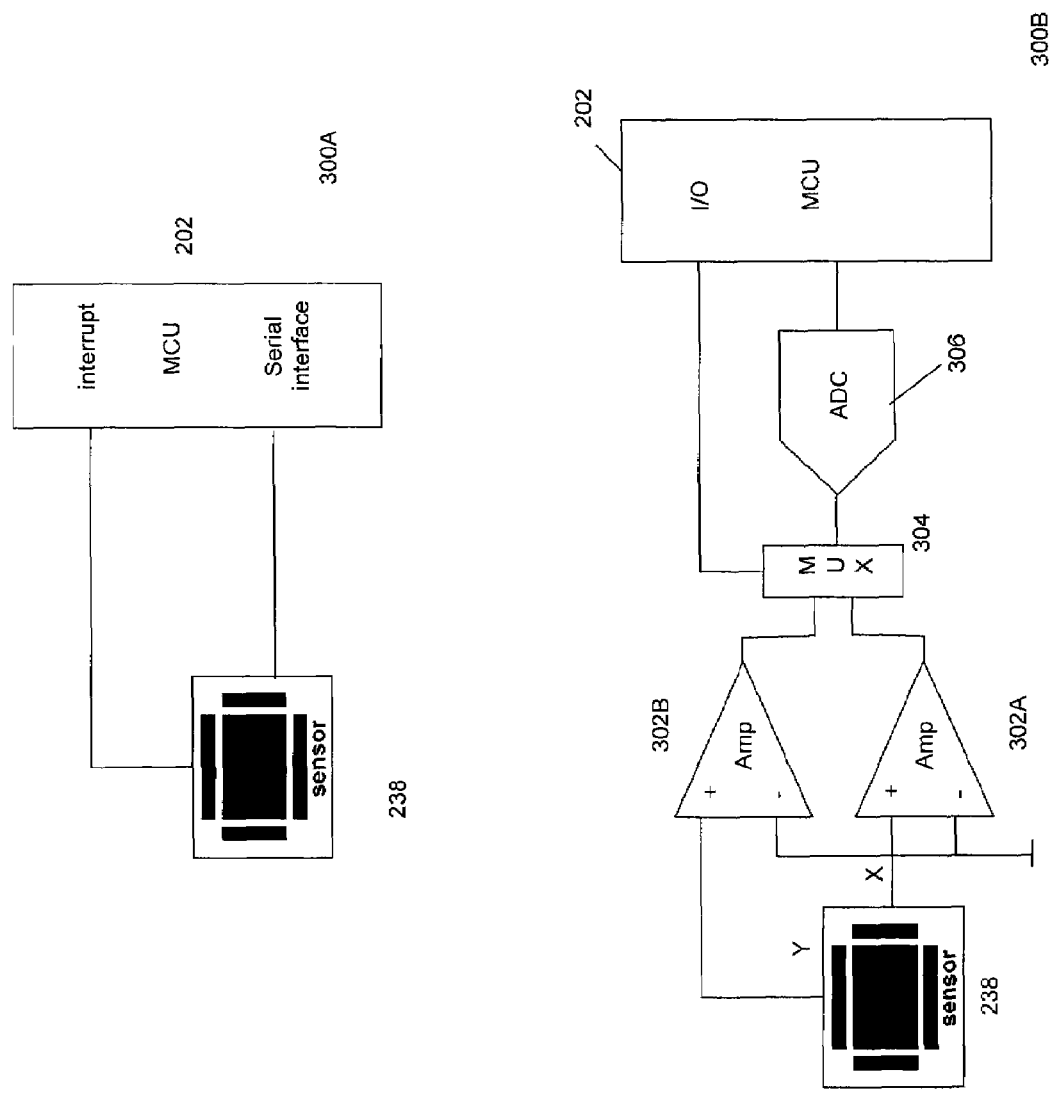
FIG. 3A is a block diagram of two separate motion detection systems of the embodiment of FIG. 1.
Figure 3B:
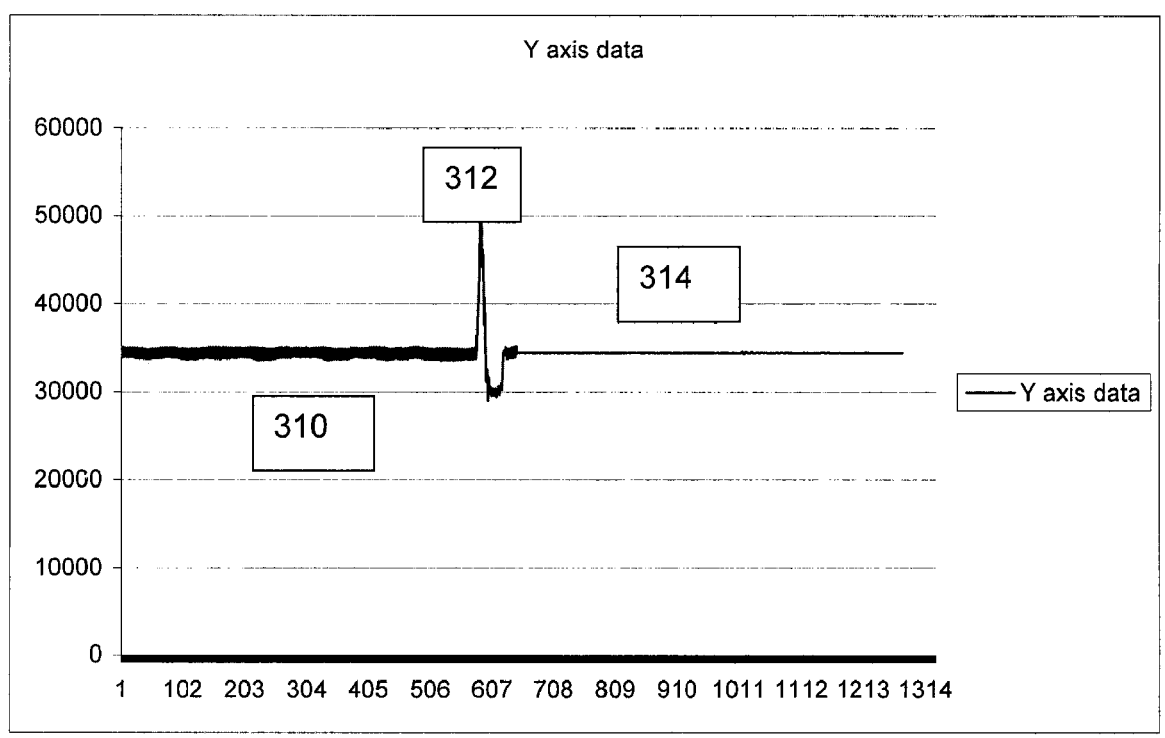
FIG. 3B is a graph illustrating an exemplary activation cycle of motion detection systems of FIG. 3A.
Figure 4:
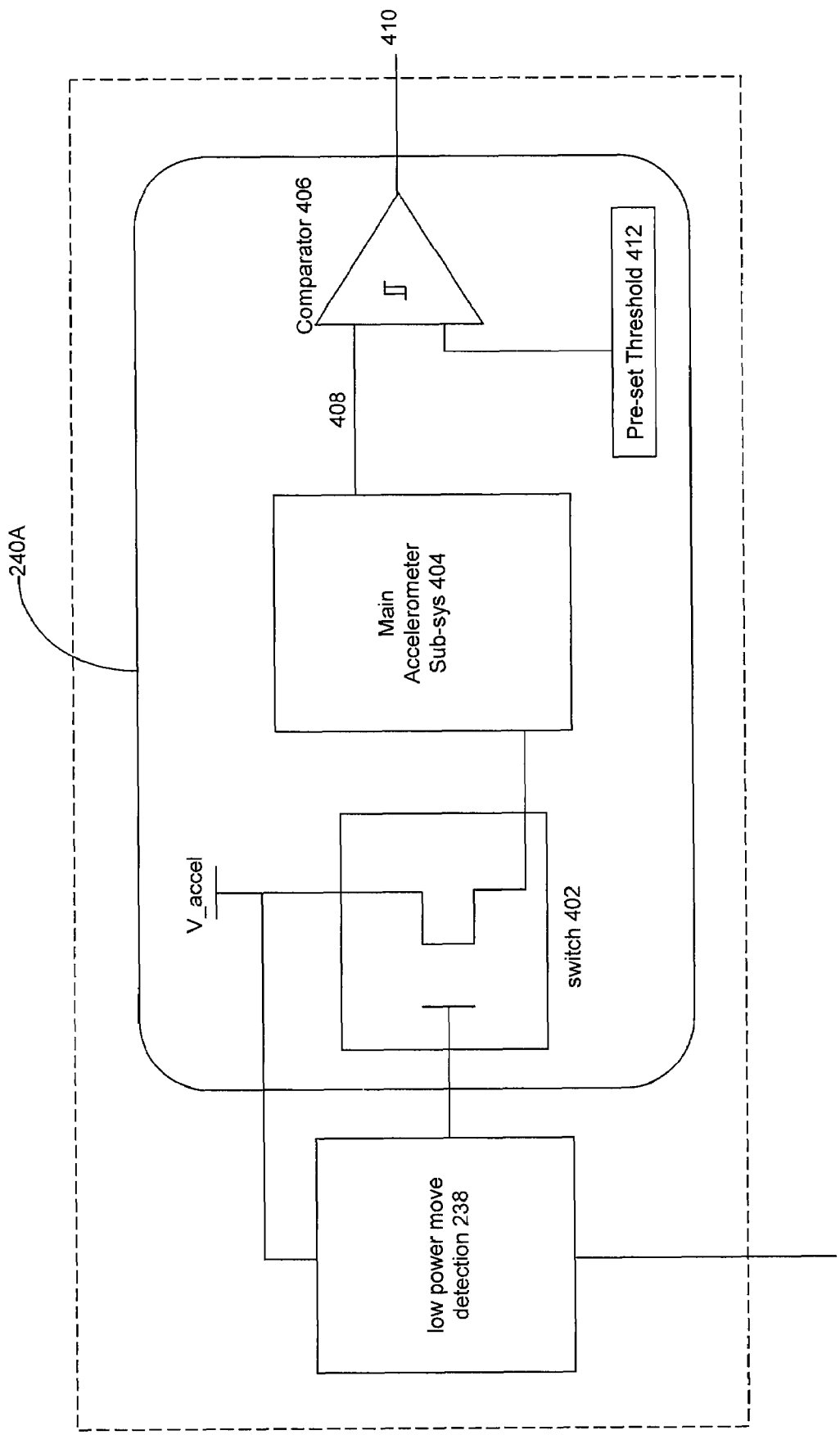
FIG. 4 is a block diagram of an alternative motion detection system the embodiment of FIG. 1.
Figure 5:
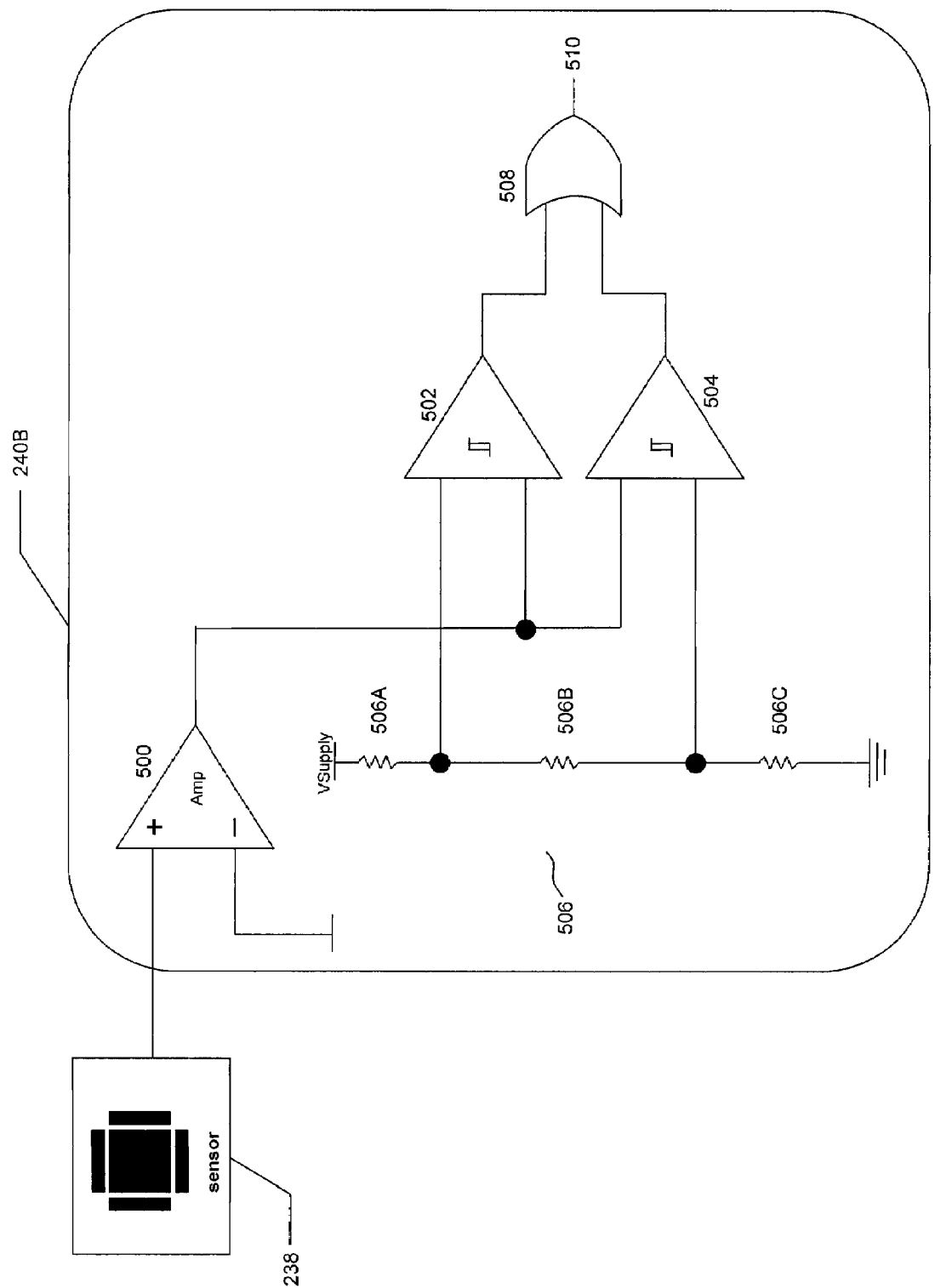
FIG. 5 is a block diagram of another alternative motion detection system for the embodiment of FIG. 1.

Referring to FIGS. 3A, 4, and 5, four exemplary controlling circuits for an enunciator are provided. Generally, the controlling circuits utilize a motion sensor to monitor for a significant movement of the device. If a predetermined sufficient and/or significant movement is detected, then the circuits can generate a trigger signal that is provided to EMM 222C. Any implementation using one or more sensors could be implemented. Circuits in FIG. 3 have a single sensor 238, while circuits in FIGS. 4 and 5 have additional "low power" operation modes which utilizes less power in a quiescent state than components in the circuits in FIG. 3A.

For any embodiment, a low-g MEMS (micro-electromechanical system) accelerometer may be used for motion sensor 238. Further, the accelerometer may be of almost any type, including a capacitive, piezoelectric, piezoresistive, or a gas-based accelerometer. An exemplary low-g MEMS accelerometer is a LIS3L02AQ tri-axis analog accelerometer, available from STMicroelectronics of Geneva, Switzerland. Accelerometers sense and convert an acceleration detected from a motion (e.g. tilt, inertial, or vibration) or gravity into an electrical signal (producing a corresponding change in output) and are available in one, two or three axis configurations. Accelerometers may produce digital or analog output signals.

Referring to FIG. 3A, two basic sensors arrangements for device 10 are shown. Circuit 300A shows sensor 238 directly connected to the interrupt and serial interface input lines of microprocessor 202. Accordingly, software operating on microprocessor 202 is provided to selectively monitor signal(s) from sensor 238 to determine whether a notable shake or movement of device 10 has been detected when an enunciation signal is being activated. Here the monitoring circuit comprises microprocessor 202. The circuit between sensor 238 and microprocessor 202 can be considered to be one version of circuit 240. Circuit 300B shows sensor 238 connected to two differential comparators 302A and 302B, which then have their outputs attached to an analog mux 304. The mux selectively provides its output according to a control signal generated by microprocessor 202. The analog output of mux 304 is converted to a set of digital signals by analog to digital converter 306, which then provides the output to microprocessor 202. As with other implementation, software operating on microprocessor 202 determines when a notable signal has been generated by sensor 238.

Referring to FIG. 3B, graph 308 shows a reading spike registered by an exemplary sensor 238 when device 10 is nudged and the subsequent de-activation of vibrator 242. Initially at graph region 310, vibrator 242 is activated. Then at region 312, device 10 is nudged. The spike indicates a first forward acceleration of device 10, then a subsequent deceleration. After the nudge is registered and accepted by device 10 as an indication to turn down vibrator 242, vibrator 242 is deactivated. Deactivation is shown at region 314, where no movement is detected by sensor 238. For a three-axis sensor, the x and y axes would be at 0 g readings and the z axis at 1 g when device 10 is lying flat on a desk. Such movements may be detected by other circuits provided herein.

In FIG. 4 in trigger circuit 240A when accelerometer (also noted by reference numeral 238) is moved, e.g. by a movement of device 10, the output signal generated by low-power accelerometer 238 is provided to switch 402. If the signal is sufficient to activate switch 402, a power signal from switch 402 is provided to main accelerometer sub-system 404 to activate it. In one embodiment, sub-system 404 provides a second motion sensor which is activated by an activation signal from switch 402. As such, when a further movement is detected, the output of the second motion sensor in sub-system circuit 404 is provided to threshold circuit, provided as comparator 406. Comparator 406 compares the signal 408 against a threshold value 412. If the size of signal 408 exceeds the threshold value 412, comparator 406 generates trigger signal 410. Trigger signal 410 represents a "true" signal received from sensor 238.

Generally, circuit 240 may be implemented as a single digital device having a series of modules, which may be separately activated and de-activated. A separate "power down" input line or command can be associated with main sub-system 404, which would then allow any signals from sensor 238 to be provided directly to the "power down" pin, bypassing switch 402. Similarly, comparator 406 and threshold value 412 may be a second module. A "power-down" pin associated with the threshold module may be tied to the output of main sub-system 404. As such, the output of sensor 238 may be used to provide an input signal to a "power-down" pin in the device. Also, when the main sub-system 404 generates an output signal, it can activate the second module which will then conduct a comparison and generate its output signal. An exemplary integrated device is a LIS3L02DQ tri-axis accelerometer having an I2C or SPI interface, also available from STMicroelectronics. In another embodiment, any of switch 402, sub-system circuit 404, threshold register 412 and comparator 406 may not be provided in the single device.

It will be appreciated that in most instances, depending on motion sensitivities set for sensor 238 and sub-system 404, when device 10 is initially moved from rest, the signal generated by sensor 238 activates sub-system 404 and the signal generated by it is sufficient to trigger the threshold detection circuit 406, to produce signal 410. However, it is possible that the movement of accelerometer 238 is large enough to trigger switch 402, but the movement may still not be considered to be valid for the remainder of the circuit. For the example, the movement may be too small to be a true activation signal, or the movement may be deemed to be spurious.

To improve sensitivities of an accelerometer when it is used as motion sensor 238, its outputs can be calibrated to compensate for individual axis offset and sensitivity variations. Calibrations can also be performed at the system level, providing end-to-end calibration. Calibrations can also be performed by collecting a large set of measurements with the device in different orientations.

Referring to FIG. 5, an alternative circuit 240B is shown for sensor 238 which is aligned as a single axis analog sensor. Sensor 238 can be oriented such that its output detects movement along a desired axis (e.g. 'Z' axis detecting when device moved vertically). Additional axes may be monitored by replicating circuit 240A for each additional axis. Briefly, the output of sensor 238 is provided to buffer amp 500. The output of buffer amp 500 is provided in tandem to comparators 502 and 504. The other inputs of comparators 502 and 504 are taken from different taps on resistor ladder 506, comprising resistors 506A, 506B and 506C. Comparators 502 and 504 each produce upper and lower limit comparison signals for the output of sensor 238. If the value of the signal from sensor 238 is either above the upper limit set by the parameters of comparator 502 (comparing the signal from sensor 238 against its tap from the resistor ladder 506) or below the lower limit set by the parameters of comparator 504 (comparing the signal from sensor 238 against its tap from the resistor ladder 506), then OR gate 508 generates a trigger signal 510. It will be appreciated that the limits can be used to define a range of signals detected by sensor 238 representing when device 10 is stationary (e.g. at rest) or when it is being moved.

For example, if device 10 is lying on a flat, horizontal surface, a trigger condition for the Z-axis of sensor 238 can be set to trigger after detecting a force greater than 1 g. When device 10 is picked up, two changes in velocity are detected along the Z-axis of sensor 238: first, a positive acceleration is detected (e.g. a force greater than 1 g) when device 10 is first picked up and is being raised from the surface; and second, a negative acceleration is detected as device 10 is brought to a given height above the surface and movement of device 10 slows down to hold it at that height. If sensor 238 is a digital device, it preferably produces a positive range of values, for example between 0 and 255, representing all detected up and down movements. In that example, the rest reading for sensor 238 for device 10 may be a value around 127. As such, up and down movements of device 10 would cause readings to move above and below the value of 127. If a movement in either direction is sufficient to trigger one of comparators 502 and 504, the reading on sensor 238 would have to be outside the tolerance window of the rest reading. Thus, OR gate 508 would generate a HIGH signal when the output signal from sensor 238 is outside the tolerance window. It will be appreciated that the limits of 1 g can be used with a tolerance buffer to compensate for noise in the signals. A comparable analog circuit may be provided if the sensor is producing a voltage signal. In other embodiments, positive and negative values produced by sensor 238 may be analyzed.

Further, if sensor 238 and trigger circuit 240 use only one accelerometer, then the output of OR gate 508 can be used as trigger signal 510. If sensor 238 and trigger circuit 240 use two accelerometers, then the output of OR gate 508 can be used to represent trigger switch 402 (FIG. 4) or a trigger signal to a Power Down pin of the second accelerometer. In such a circuit, the output of comparators 502 and 504 can be set to be LOW when the first accelerometer detects movements in only about the 1 g range. Low-pass filtering may also be added to reduce noise and invalid signals being generated by the comparators. In other embodiments, a single comparator can be used to perform comparisons.

It will be appreciated that other circuits using different combinations of sensors and triggering components and threshold detectors may be used to provide functionalities of sensor 238 and circuit 240. An alternative embodiment may use a different stimulus having a different sensor (e.g. a proximity sensor) to activate a trigger circuit. As such, in other embodiments, motion sensor 238 may be substituted or combined with a different device, such as a spring-loaded switch, a keypad, an infrared sensor, a capacitive touch sensor, a proximity sensor, a location sensor, a presence detector, a mercury switch, a microphone, a light sensor or any other device which can generate a signal responsive to a stimulus condition predetermined to indicate that the output of the enunciator should be moderated. It is preferable that the device have low quiescent power draw characteristics. It will be further appreciated that other motion sensor management circuits known in the art may be used, as appropriate. In other embodiments, additional circuits may be implemented for circuit 240 to provide additional power saving features. For the sake of convenience and not limitation, all of the above noted types of specific sensors are generically referred to as a "sensor".

Further detail is now provided on circuits, software, procedures and systems used by an embodiment to activate, control and interpret signals for an enunciator and signals from a motion sensor to control output levels for the enunciator.

EMM 222C provides an interface to the user of device 10 to define operational aspects of enunciators when they are activated by applications 222. Operational controls may be provided through a series of graphical user interfaces (GUIs) that are generated by EMM 222C and displayed on display 14. As per typical GUIs, the user of device 10 can navigate through a particular GUI that provides one or more selection options using a trackwheel 20 and keypad 24 or any other input device. Alternatives for a selection option can also be entered through trackwheel 20 and/or keypad 24.

Figure 6:
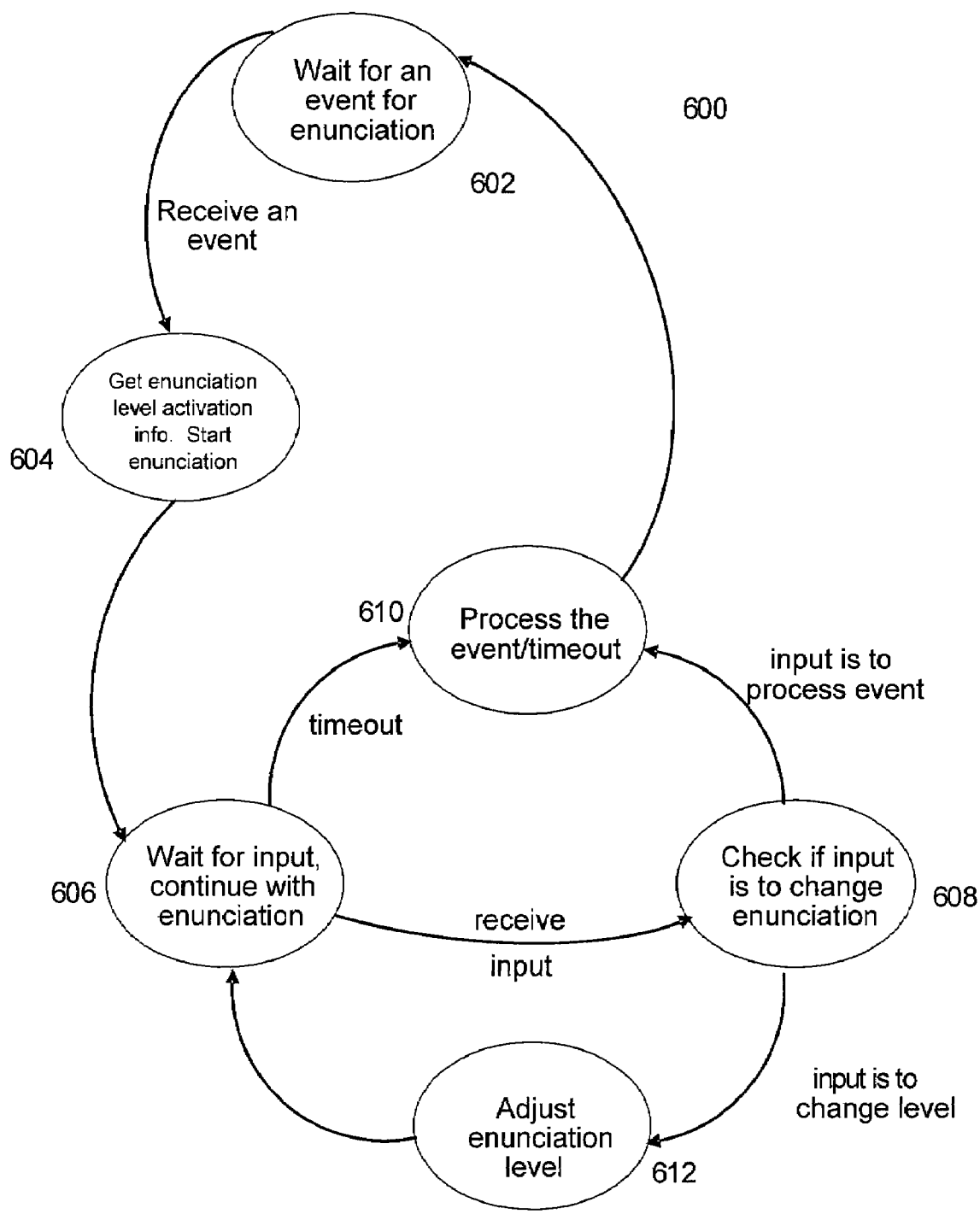
FIG. 6 is a state diagram of an exemplary enunciator control system executed by the embodiment of FIG. 1.

Referring to FIG. 6, further detail on the operation of the system and method of an embodiment is provided by description of exemplary states that EMM 222C progresses through during operation of device 10. It will be appreciated that EMM 222C may operate in the background of an application on device 10. Process 600 illustrates as a state diagram, transitions of states of EMM 222C. EMM 222C may be an interrupt-based procedure, a polling-based procedure or may be incorporated into one or more applications 222 themselves. EMM 222C can send and receive status messages to other applications 222 on device 10.

In general, at state 602, EMM 222C is activated, and an application 222 is waiting for an event (e.g. receipt of an email or an incoming telephone call or announcement of a wake up event or meeting). When an event occurs in the application, the application 222 then generates and sends a signal to EMM 222C (or EMM 222C detects the event). As such, EMM 222C progresses to state 604. In state 604, EMM 222C receives the signal (or detects the event) and analyzes any previously stored data relating to the current intensity level for the enunciator and any programmed response to any motion sensor. EMM 222C then generates and initiates an appropriate control signal through microprocessor 202. Microprocessor 202 can then generate an appropriate enunciation level signal to the enunciator. Microprocessor 202 may have one or more separate processes associated with it to receive and process the control signals from EMM 222C. As such, after EMM 222C has sent its control signal towards the enunciator, the enunciator is activated and generates a physical signal.

For the next state 606, EMM 222C continues with the enunciation at its programmed interval and level (e.g. periodic beep etc.). In state 606, EMM 222C is waiting for another input, by monitoring, for e.g., for any detectable movement or activation of device 10 through signals provided from circuit 240 relating to sensor 238 and/or sensor 304. During this period, if a user picks up device 10 or moves it in a sufficient manner to cause circuit 240 to generates its control signal, then EMM 222C receives this trigger signal as an input. The signal may be processed through microprocessor 202 to provide the value of the signal through a data value.

If an input is received, then EMM 222C progresses to state 608, where the input is analyzed. The input may be a signal to process the event (e.g. the received email is opened or the telephone call is answered or the meeting announcement is acknowledged), then the system progresses to state 610 and the event is processed. If a predetermined input (e.g. stimulus) is received to change the enunciation level (e.g. by detection of a preset movement threshold of the device by a motion sensor or the activation of a key on the keypad), EMM 222C progresses to state 612, where the output level of the enunciator is changed, per any predetermined settings. In this state, EMM 222C may access any preset data for any preset reactions to an input trigger signal for the enunciator. A preset reaction may include reducing a vibrator level from "high" to "medium" for vibrator 242, reducing the volume of a ring tone generated on speaker 16 or any other preset reaction for an enunciator. EMM 222C then identifies an appropriate adjusted output signal for an enunciator (which may include making no adjustment) and generates and sends the revised control signal to the enunciator. For example, if the announcement is a wake-up call, then this may be used as a "snooze" indicator by the application and the enunciator may be silenced for a preset time.

Thereafter EMM 222C moves back to state 606 and waits for a further input. If no input is received, then EMM 222C may move to state 610 to further process the event (e.g. send the call to voicemail; wait for the snooze time to elapse). Once the event is processed, EMM 222C can return to state 502 to process a subsequent event. Optionally, the output level of an enunciator may be reset to a default level after a predetermined period of time has elapsed. The period of time may be measured as of the last activation of the enunciator.

Figure 7:
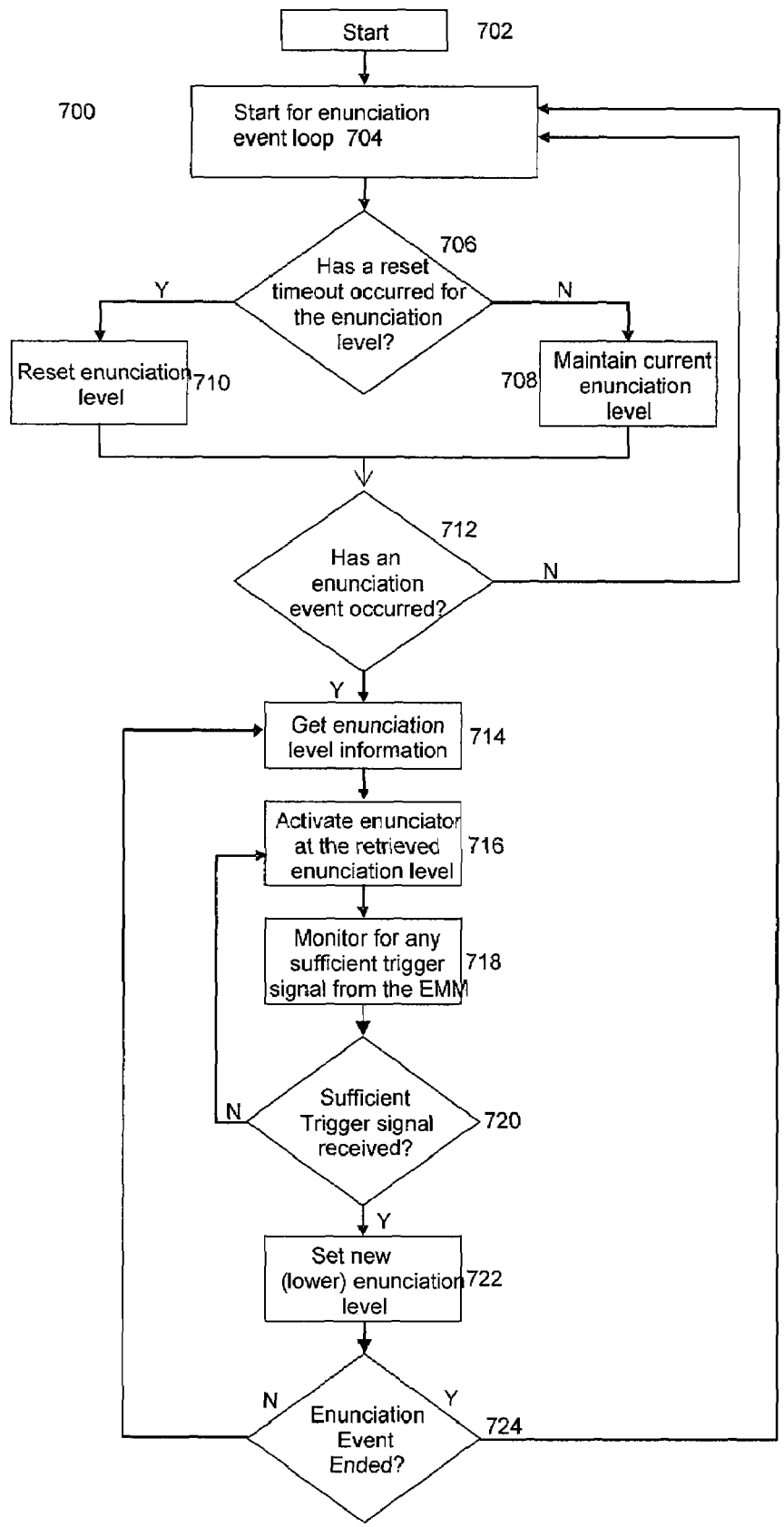
FIG. 7 is a flowchart of exemplary steps executed by the embodiment of FIG. 1 in controlling the output of the enunciator.

Referring to FIG. 7, process 700 is a flowchart of steps executed in an exemplary embodiment also possibly provided in EMM 222C) in controlling the output level of an enunciator.

First, at step 702, the overall process is started, which then immediately proceeds to stage 704, representing the start point for an enunciation event loop, where the loop monitors for an enunciation event for an application (e.g. the arrival of an email for an email application).

At step 706, a test is conducted to see if a timeout has occurred since the last enunciation event. This timeout can be used to set or reset the enunciation level when a specified amount of time has passed. This reset value can be provided in the GUI module that controls EMM 222C (described later). If a timeout has occurred, then the enunciation level is reset, per step 710. If the timeout has not occurred, then the enunciation level is maintained, per step 708.

From either step 708 or step 710 the next step is test 712, which evaluates whether an enunciation event has occurred. If no event has occurred then the process returns to step 704. If an event has occurred then the enunciation level is retrieved, per step 714. Next at step 716, the enunciator is activated using the retrieved enunciation level.

Thereafter at step 720, a test is made to see whether a sufficient trigger signal has been received (e.g. from trigger circuit 240) for the motion sensor. If not, the process returns to step 716. If such a trigger has been received, then the process proceeds to step 722 where a new (lower) enunciation level is retrieved. Next at step 724, a general test is made to determine whether the enunciation event has ended or not. If it has, the process is essentially over and the process returns to step 704. If it has not, then the lower enunciation level can be activated, by progressing back to step 716.

It will be appreciated that the overall flow of process 700 may be re-arranged in other embodiments to still accomplish similar or equivalent steps, although in a different order. Also, additional processes may be operating at the same time as process 700.

A variant of the embodiment would, after setting the enunciation level to the lower, second level, initiate a short enunciation of the enunciator at the lower level. For example, if device 10 vibrates on a notification, when the user nudges it, the device activates a short vibration at the lower level to acknowledged the nudge and its effect to switch to the lower level.

Further detail is now provided on an exemplary system for providing a user with programming control of enunciation levels. The user is provided with GUIs generated on device 10 to provide options for controlling operation of EMM 222C and various programming modes for EMM 222C and trigger circuit 240. Such GUIs allow EMM 222C to control and set the level, duration and type of output signal that an enunciator provides. For example, voice communication module 222A may be set to activate both vibrator 242 and LED 18 when an incoming call is detected, with vibrator 242 set to operate at a "medium" level for 3-second pulses and LED 18 set to quickly flash. Such options are provided through the GUI. Data relating to how and when enunciators are activated and whether output levels for enunciators are reset to a default level after a preset amount of time for each application 222 may be stored in device 10 in flash memory 216 as adjustment information. Such adjustment information is accessible selectively on a read/write access by one or more applications 222.

EMM 222C also provides an interface that allows a user to set how an output level for one or more enunciators is modified when a triggering signal is received from circuit 240. For example, the GUI may provide a list of output level options for buzzer or vibrator to allow its output level to be selected among "loud buzz", "medium buzz", "quiet buzz" and "off". Similar selections can be provided for output options for speaker 16, LED 18 and other enunciators. Further, an adjustment may be provided to an output of a selected enunciator while leaving other outputs of other enunciator unchanged. After an adjustment is made, the adjusted level may or may not be used for subsequent enunciations.

A single GUI application may be provided to control screens and process, retrieve and store adjustment information and enunciation levels for enunciators for the other applications 222. As such, EMM 222C and/or its functionality, may be incorporated into a profile configuration (software) module that provides a global GUI allowing parameters for output levels of several enunciators to be adjusted for several applications. For example, a "loud" profile can be set where first and second lower outputs for a set of enunciators are set at two predetermined levels, whereas a "normal" profile sets the two levels of outputs for the same set of enunciators at lower levels. For the GUI, the current profile may be displayed on display 14 as a small icon, which can reflect some aspects of the settings in the profile.

EMM 222C also provides an interface that allows a user to determine parameters for identifying an acceptable trigger signal when signals are received from circuit 240. For example, the GUI may provide a selection of minimum movements detected by motion sensor 238 for the threshold circuit 306 (FIG. 3). Such movements can be translated into a set of described levels of activity (e.g. "hard shake", "medium shake", and "any movement"). Similar selections can be provided for minimum requirements for other types of motion detectors.

It will be appreciated that baseline sensitivities for a motion sensor may be programmed or learned by device 10. For example, if device 10 is being used while in a car or while the user is jogging, there may be a certain amount of ambient movement detected by sensor 238. Through a routine that periodically reads signals detected by sensor 238, an average "baseline" movement signal can be determined for when device 10 is at "rest" (i.e. a normalized net resting position for its current environment). As such, any movement signal is compared against the baseline movement signal to determine a "normalized" movement of device 10, as adjusted for its current environment.

The embodiment provides adjustment and calibration of such baseline sensitivities through EMM 222C and a GUI. In the GUI, the user is provided with an option for the device 10 to take baseline measurements for a selectable period of time and is further provided the option to use the baseline measurement when analyzing additional signals from the motion sensor 238.

EMM 222C may provide preset modes to manage subsequent activations of an enunciator once its output has been modified by EMM 222C. For example, a mode may be provided where the output to enunciator is subsequently moderated for a preset time after an initial adjustment.

In an embodiment, a specific gesture detected by sensor 238 and/or sub-system 304 may be required to activate device 10, such as a quick "snap" movement in a certain direction of device 10 or the movement of device 10 in a clockwise circular pattern. That gesture can be broken down into a series of sequential notable components. As the gesture is being executed by a user with device 10 in hand, sensor 238 and/or sub-system 304 detects each component of the gesture, and each component is analyzed to determine by software operating on microprocessor 202 whether the gesture has been properly formed, and thereafter provide a signal to activate device 10.

The present invention is defined by the claims appended hereto, with the foregoing description being merely illustrative of embodiments of the invention. Those of ordinary skill may envisage certain modifications to the foregoing embodiments which, although not explicitly discussed herein, do not depart from the scope of the invention, as defined by the appended claims.

I claim:

1. A mobile communication device having voice and data capabilities, comprising:
   a microprocessor to control the operation of the mobile communication device;
   an enunciator connected to the microprocessor configured to provide an enunciation in response to enunciation events comprising telephone calls and electronic notifications in relation to applications operating on the mobile communication device, wherein the enunciator is an output device capable of generating an enunciation comprising one or a combination of a visual, audio and physical indication, wherein each type of enunciation event is associated with a particular enunciation and each has a first enunciation setting and a second enunciation setting;
   a memory connected to the microprocessor to store data relating to the first and second enunciation settings;
   a sensor;
   a monitoring circuit connected to the sensor for providing a trigger signal in response to a notable activation of the sensor; and
   an enunciator management module to:
   activate the enunciator in response to an enunciation event to generate an enunciation at the first enunciation setting, the enunciation generated depending on the type of enunciation event; and
   adjust the output of the enunciator to the second enunciation setting in response to a first trigger signal from the monitoring circuit;
   wherein the enunciator management module is configured to compare the trigger signal against a baseline movement level and to adjust the output of the enunciator to the second enunciation setting when the trigger signal exceeds the baseline movement level, and wherein the enunciator management module is configured to learn the baseline movement level in accordance with baseline measurements taken over a period of time.

2. The mobile communication device as claimed in claim 1, further comprising:
   an application for providing a graphical user interface (GUI) operating on the device to allow a user of the device to set adjustment information and to set the first and second enunciation settings.

3. A mobile communication device having voice and data capabilities, comprising:
   a microprocessor to control the operation of the mobile communication device:
   an enunciator connected to the microprocessor configured to provide an enunciation in response to enunciation events comprising telephone calls and electronic notifications in relation to applications operating on the mobile communication device, wherein the enunciator is an output device capable of generating an enunciation comprising one or a combination of a visual, audio and physical indication, wherein each type of enunciation event is associated with a particular enunciation and each has a first enunciation setting and a second enunciation setting;
   a memory connected to the microprocessor to store data relating to the first and second enunciation settings;
   a sensor;
   a monitoring circuit connected to the sensor for providing a trigger signal in response to a notable activation of the sensor; and
   an enunciator management module to:
   activate the enunciator in response to an enunciation event to generate an enunciation at the first enunciation setting, the enunciation generated depending on the type of enunciation event;
   adjust the output of the enunciator to the second enunciation setting in response to a first trigger signal from the monitoring circuit; and
   re-activate the enunciator at the second enunciation setting in response to the enunciation event at predetermined intervals.

4. The mobile communication device as claimed in claim 3, wherein after adjusting the output of the enunciator to the second enunciation setting, the enunciator management module activates the output of the enunciator at the second enunciation setting upon a subsequent enunciation event.

5. The mobile communication device as claimed in claim 3, wherein after a preset time from the enunciation event the output of the enunciator is changed from second enunciation setting to the first enunciation setting.

6. The mobile communication device as claimed in claim 3, wherein the enunciator comprises any one or a combination of a buzzer, a vibrator, a light, a tone generator and a speaker.

7. The mobile communication device as claimed in claim 3, wherein the electronic notification is an email notification, a calendar notification, or a wake up notification, wherein each of the email notification, calendar notification, and wake up notification are associated with a particular enunciation and each having a first enunciation setting and a second enunciation setting.

8. The mobile communication device as claimed in claim 3, wherein the first enunciation setting is a first enunciation level and second enunciation setting is a second enunciation level, wherein the second enunciation level is lower than the first enunciation level.

9. The mobile communication device as claimed in claim 3, wherein the first and second enunciation settings are different, and wherein the first and second enunciation settings are one of: a high level, a medium level, a low level and no enunciation.

10. The mobile communication device as claimed in claim 3, wherein the sensor comprises one or more axial sensors, and wherein the notable movement is a predetermined pattern of movement of the mobile communication device.

11. The mobile communication device as claimed in claim 3, wherein the sensor is an accelerometer.

12. The mobile communication device as claimed in claim 3, wherein the sensor is a capacitive sensor.

13. The mobile communication device as claimed in claim 3, wherein the first and second enunciation settings for the enunciator are used by a plurality of applications operating on the mobile communication device.

14. A mobile communication device having voice and data capabilities, comprising:
 a microprocessor to control the operation of the mobile communication device;
 an enunciator connected to the microprocessor configured to provide an enunciation in response to enunciation events comprising telephone calls and electronic notifications in relation to applications operating on the mobile communication device, wherein the enunciator is an output device capable of generating an enunciation comprising one or a combination of a visual, audio and physical indication, wherein each type of enunciation event is associated with a particular enunciation and each has a first enunciation setting and a second enunciation setting;
 a memory connected to the microprocessor to store data relating to the first and second enunciation settings;
 a sensor;
 a monitoring circuit connected to the sensor for providing a trigger signal in response to a notable activation of the sensor; and
 an enunciator management module to:
  activate the enunciator in response to an enunciation event to generate an enunciation at the first enunciation setting, the enunciation generated depending on the type of enunciation event;
  adjust the output of the enunciator to the second enunciation setting in response to a first trigger signal from the monitoring circuit; and
  adjust the output of the enunciator from the second enunciation setting to a third enunciation setting in response to a further trigger signal from the monitoring circuit.

15. A method for controlling an enunciator for a mobile communication device having voice and data capabilities, the enunciator being configured to provide an enunciation in response to enunciation events comprising telephone calls and electronic notifications in relation to an application operating on the mobile communication device, wherein the enunciator is an output device capable of generating an enunciation comprising one or a combination of a visual, audio and physical indication, wherein each type of enunciation event is associated with a particular enunciation and each has a first enunciation setting and a second enunciation setting, the method comprising:
 setting an output of the enunciator to a first enunciation setting;
 activating the enunciator in response to an enunciation event at the first enunciation setting, the enunciation generated depending on the type of enunciation event;
 learning a baseline movement level in accordance with baseline measurements taken over a period of time;
 monitoring for a trigger signal generated in response to a notable movement of the mobile communication device; and
 comparing the trigger signal against the baseline movement level; and
 adjusting the output of the enunciator from the first enunciation setting to the second enunciation setting when the trigger signal exceeds the baseline movement level.

16. A method for controlling an enunciator for a mobile communication device having voice and data capabilities, the enunciator being configured to provide an enunciation in response to enunciation events comprising telephone calls and electronic notifications in relation to an application operating on the mobile communication device, wherein the enunciator is an output device capable of generating an enunciation comprising one or a combination of a visual, audio and physical indication, wherein each type of enunciation event is associated with a particular enunciation and each has a first enunciation setting and a second enunciation setting, the method comprising:
 setting an output of the enunciator to a first enunciation setting;
 activating the enunciator in response to an enunciation event at the first enunciation setting, the enunciation generated depending on the type of enunciation event;
 monitoring for a notable movement of the mobile communication device; and
 if the movement is detected, changing the output from the first enunciation setting to a second enunciation setting;
 after setting the enunciation setting at the second enunciation setting, re-activating the enunciator at the second enunciation setting in response to the enunciation event at predetermined intervals.

17. The method as claimed in claim 16, further comprising:
 after setting the enunciation setting at the second enunciation setting, activating the enunciator at the second enunciation setting upon a subsequent enunciation event.

18. The method as claimed in claim 16, further comprising:
 after a preset time from the enunciation event, changing the output of the enunciator from second enunciation setting to the first enunciation setting.

19. The method as claimed in claim 16, wherein the enunciator comprises any one or a combination of a buzzer, a vibrator, a light, a tone generator and a speaker.

20. The method as claimed in claim 16, wherein the electronic notification is an email notification, a calendar notification, or a wake up notification, wherein each of the email notification, calendar notification, and wake up notification are associated with a particular enunciation and each having a first enunciation setting and a second enunciation setting.

21. The method as claimed in claim 16, wherein the first enunciation setting is a first enunciation level and second enunciation setting is a second enunciation level, wherein the second enunciation level is lower than the first enunciation level.

22. The method as claimed in claim 16, wherein the first and second enunciation settings are different, and wherein the first and second enunciation settings are one of: a high level, a medium level, a low level and no enunciation.

23. The method as claimed in claim 16, wherein the notable movement is a predetermined pattern of movement of the mobile communication device.

24. The method as claimed in claim 16, wherein the first and second enunciation settings are used by a plurality of applications operating on the mobile communication device that utilize the enunciator.

25. A method for controlling an enunciator for a mobile communication device having voice and data capabilities, the enunciator being configured to provide an enunciation in response to enunciation events comprising telephone calls and electronic notifications in relation to an application operating on the mobile communication device, wherein the enunciator is an output device capable of generating an enunciation comprising one or a combination of a visual, audio and physical indication, wherein each type of enunciation event is associated with a particular enunciation and each has a first enunciation setting and a second enunciation setting, the method comprising:

setting an output of the enunciator to a first enunciation setting;

activating the enunciator in response to an enunciation event at the first enunciation setting, the enunciation generated depending on the type of enunciation event;

monitoring for a notable movement of the mobile communication device; and if the movement is detected, changing the output from the first enunciation setting to a second enunciation setting;

after adjusting the output of the enunciator to the second enunciation setting, adjusting the output of the enunciator from the second enunciation setting to a third enunciation setting in response to a further notable movement of the mobile communication device.

\* \* \* \* \*

UNITED STATES PATENT AND TRADEMARK OFFICE
CERTIFICATE OF CORRECTION

PATENT NO.       : 7,639,130 B2                                    Page 1 of 1
APPLICATION NO. : 11/536189
DATED            : December 29, 2009
INVENTOR(S)      : Kevin Orr It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 571 days.

Signed and Sealed this

Ninth Day of November, 2010

David J. Kappos
*Director of the United States Patent and Trademark Office*